(12) United States Patent
Sears et al.

(10) Patent No.: US 10,982,991 B2
(45) Date of Patent: Apr. 20, 2021

(54) VIBRATING FORK LEVEL SWITCHES

(71) Applicant: ROSEMOUNT TANK RADAR AB, Mölnlycke (SE)

(72) Inventors: Jeffery Allan Sears, Berkshire (GB); Jingdong Zhang, Berkshire (GB); Tadewos Tzegazeab, Berkshire (GB); Kevin Thomas, Victoria, MN (US)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 170 days.

(21) Appl. No.: 16/322,582

(22) PCT Filed: Aug. 2, 2017

(86) PCT No.: PCT/GB2017/052245
§ 371 (c)(1),
(2) Date: Feb. 1, 2019

(87) PCT Pub. No.: WO2018/025033
PCT Pub. Date: Feb. 8, 2018

(65) Prior Publication Data
US 2019/0186980 A1    Jun. 20, 2019

(30) Foreign Application Priority Data

Aug. 3, 2016 (GB) .................................... 1613381

(51) Int. Cl.
*G01F 25/00* (2006.01)
*G01N 9/00* (2006.01)
*G01F 15/02* (2006.01)
*G01H 3/04* (2006.01)
*G01F 23/296* (2006.01)

(52) U.S. Cl.
CPC .......... *G01F 25/0061* (2013.01); *G01F 15/02* (2013.01); *G01F 23/2967* (2013.01); *G01H 3/04* (2013.01); *G01N 9/002* (2013.01); *G01N 2009/006* (2013.01)

(58) Field of Classification Search
CPC .... G01N 9/002; G01N 2009/006; G01H 3/04; G01H 13/00; G01F 23/2967; G01F 25/0061
USPC ................................... 73/32 A, 32 R, 290 V
See application file for complete search history.

(56) References Cited

U.S. PATENT DOCUMENTS

| 6,389,891 B1 | 5/2002 | D'Angelico et al. |
| 2007/0272209 A1 | 11/2007 | Matsiev et al. |
| 2011/0226054 A1 | 9/2011 | Sears et al. |

(Continued)

FOREIGN PATENT DOCUMENTS

| CN | 1416522 A | 5/2003 |
| CN | 102460090 B | 12/2014 |

OTHER PUBLICATIONS

First Office Action, for related Chinese Patent Application No. 201780049126.X, dated Jun. 16, 2020, 15 pages.

(Continued)

*Primary Examiner* — Benjamin R Schmitt
(74) *Attorney, Agent, or Firm* — Westman, Champlin & Koehler, P.A.

(57) ABSTRACT

The invention provides a method for configuring for use a vibrating fork level switch having a dry fork frequency DFF. The method involves establishing a wet fork frequency WFF and combining this with the DFF to configure the switch for use in media of differing densities.

8 Claims, 5 Drawing Sheets

(56) References Cited

U.S. PATENT DOCUMENTS

2012/0111106 A1    5/2012  Smallwood

OTHER PUBLICATIONS

Notification of Transmittal of the International Search Report and the Written Opinion of the International Searching Authority from International Application No. PCT/GB2017/052245, dated Nov. 17, 2017.
Search Report from GB Application No. 1613381.1, dated Nov. 16, 2016.

FIG. 5

| Liquid density (kg/m^3) | Error for switch point(mm) | |
|---|---|---|
| | Prior art | Invention |
| 400 | -2.8 | 0.0 |
| 600 | -0.5 | 0.1 |
| 800 | 1.6 | 0.0 |
| 1000 | -0.1 | 0.0 |
| 1200 | 1.9 | -0.1 |
| 1400 | -3.8 | -0.1 |
| 2000 | 1.3 | 0.1 |
| 3000 | 8.1 | 0.0 |

FIG. 6

| Media Density | Wet Frequency (wf) at full immersion | | | | | |
|---|---|---|---|---|---|---|
| | Dry frequency of fork | | | | | |
| | f1-f2 | f2-f3 | f3-f4 | f4-f5 | f5-f6 | f6-f7 |
| Low | wf1-wf2 | wf6-wf7 | wf11-wf12 | wf16-wf17 | wf21-wf22 | wf26-wf27 |
| Medium | wf2-wf3 | wf7-wf8 | wf12-wf13 | wf17-wf18 | wf22-wf23 | wf27-wf28 |
| Normal | wf3-wf4 | wf8-wf9 | wf13-wf14 | wf18-wf19 | wf23-wf24 | wf28-wf29 |
| High | wf4-wf5 | wf9-wf10 | wf14-wf15 | wf19-wf20 | wf24-wf25 | wf29-wf30 |

# VIBRATING FORK LEVEL SWITCHES

CROSS-REFERENCE TO RELATED APPLICATION

This Application is a Section 371 National Stage Application of International Application No. PCT/GB2017/052245, filed Aug. 2, 2017 and published as WO 2018/025033 on Feb. 8, 2018, in English, which claims priority to GB Application No. 1613381.1, filed Aug. 3, 2016, the contents of which are hereby incorporated by reference in their entirety.

FIELD OF THE INVENTION

This invention relates to vibrating fork level switches and, in particular to a method of calibrating a vibrating fork level switch.

BACKGROUND TO THE INVENTION

Vibrating fork level switches are commonly used to detect when the surface of a fluid in a tank is at a particular level, that level being the height at which the fork is positioned in the tank. Typically fork level switches are configured to self-oscillate through a positive feedback loop in an electronic circuit where the phase delay between the transmitting and receiving elements is carefully tuned to ensure the positive feedback signal is in phase.

In operation, in "normally dry" applications, the frequency of vibration will be at one level when the fork is in air ('dry'), but will drop when the liquid in the tank rises into contact with the fork ('wet'). In "normally wet" applications the reverse applies and the frequency will rise as the liquid falls below the level of the fork.

The 'dry' frequency of a vibrating fork level switch is typically established at point of manufacture and this then establishes the switching point i.e. the point at which the switch changes from indicating 'dry' to indicating 'wet'. This arrangement is really only satisfactory for switches that are to be used in media of substantially constant density and at substantially the same ambient conditions as the switch point will be shifted by changes in media density, process temperature and process pressure. The effects of temperature and pressure are linear and thus can be easily compensated, however the effect of density is more complex. In an effort to address this problem, vibrating fork level switches have been offered having the ability to be adapted for use in different density ranges. For example the Rosemount® Model 2160 has three optional density operating ranges selectable by a HART command setting and the Rosemount® Model 2130 switch has two optional density operating ranges but the selected range must be configured in the factory. Vibrating fork level switches are also available having the capacity to select, by a manually operated dial, a density operating range.

From a manufacturing perspective it is adds cost and complexity to provide level switches with discrete selectable operating ranges. From a user perspective, configuring a switch requires advance information on media and process conditions about which a prospective customer and/or service engineer may not be fully informed.

It is an object of the invention to provide a method and/or apparatus that will go at least some way in addressing the aforementioned problems; or which will at least provide a novel and useful choice.

SUMMARY OF THE INVENTION

Accordingly, in one aspect, the invention provides a method of configuring for use a level switch having a vibrating sensor, said method being characterized in that it includes using a frequency reading (WFF) obtained from fully immersing said sensor in a medium with which said switch is to be used.

Preferably said method includes first establishing for said switch a relationship between WFF and density; and a frequency of vibration of the switch in air (DFF)

Preferably said method comprises combining measures of DFF and WFF to determine a density of said medium.

Preferably said method further comprises establishing a relationship between density and switching frequency at a given point for said switch; identifying the density of said medium within said relationship; and establishing a switching point for said switch in said medium.

Alternatively said method comprises establishing a switching point frequency (SF) for said switch from the DFF and WFF based on a polynomial, Preferably said polynomial is a $6^{th}$ order polynomial.

Preferably said measures of DFF and WFF are classified into bands, the combination of two bands being used to establish a density classification for said medium.

Preferably said method further comprises allocating a switching frequency to each density classification at a given switch point.

The invention may also be used to determine the content of one medium suspended in another for example, the percentage of sand suspended in water. In this event, based on knowing the density $\rho_o$ of the base or carrier liquid and the DFF, the percentage of particles in the parent liquid can be calculated by measuring WFF of the combination which then leads to an indication of density $\rho$. The percentage of medium in the carrier liquid can then be calculated according to an expression such as:

$$PCP=((\rho-\rho_o)/\rho_o)\times 100$$

In a second aspect the invention provides a vibrating fork level switch when configured to undertake and/or apply the methods set forth above.

Many variations in the way the present invention can be performed will present themselves to those skilled in the art. The description which follows is intended as an illustration only of one means of performing the invention and the lack of description of variants or equivalents should not be regarded as limiting. Wherever possible, a description of a specific element should be deemed to include any and all equivalents thereof whether in existence now or in the future.

BRIEF DESCRIPTION OF THE DRAWINGS

One preferred form of the invention will now be described with reference to the accompanying drawings in which:

FIG. 5: is a table which compares the switching performance of a prior art vibrating fork level switch with that of a similar switch but configured for use according to the invention;

FIG. 6: is a table illustrating how the invention might be embodied in a production vibrating fork switch.

DETAILED DESCRIPTION OF WORKING EMBODIMENT

Figure 1:
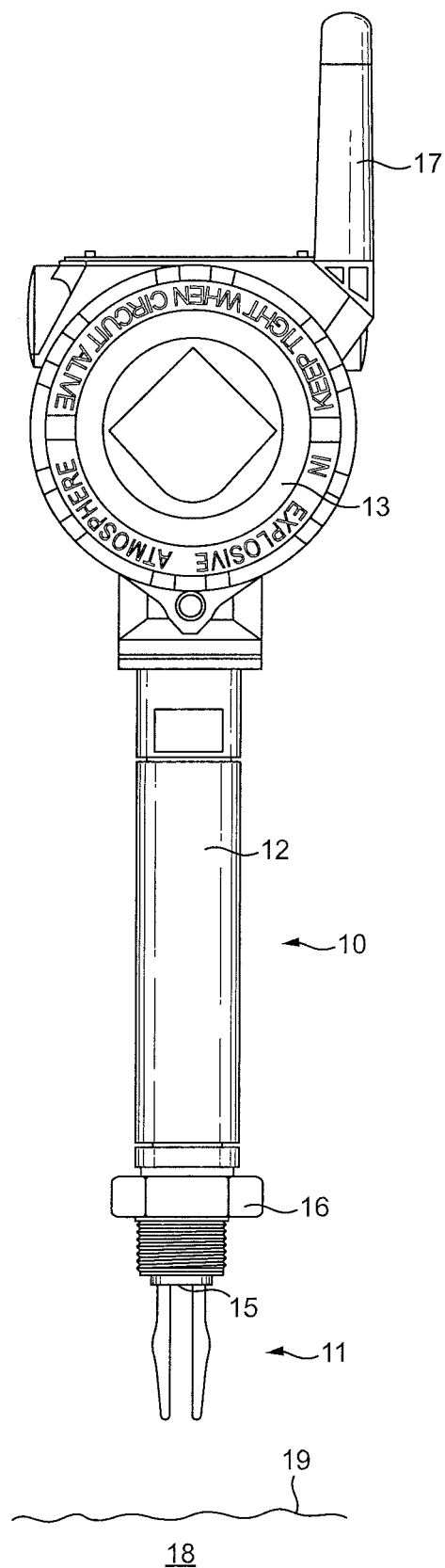
FIG. 1: shows a vibrating fork level switch in air.
Figure 2:
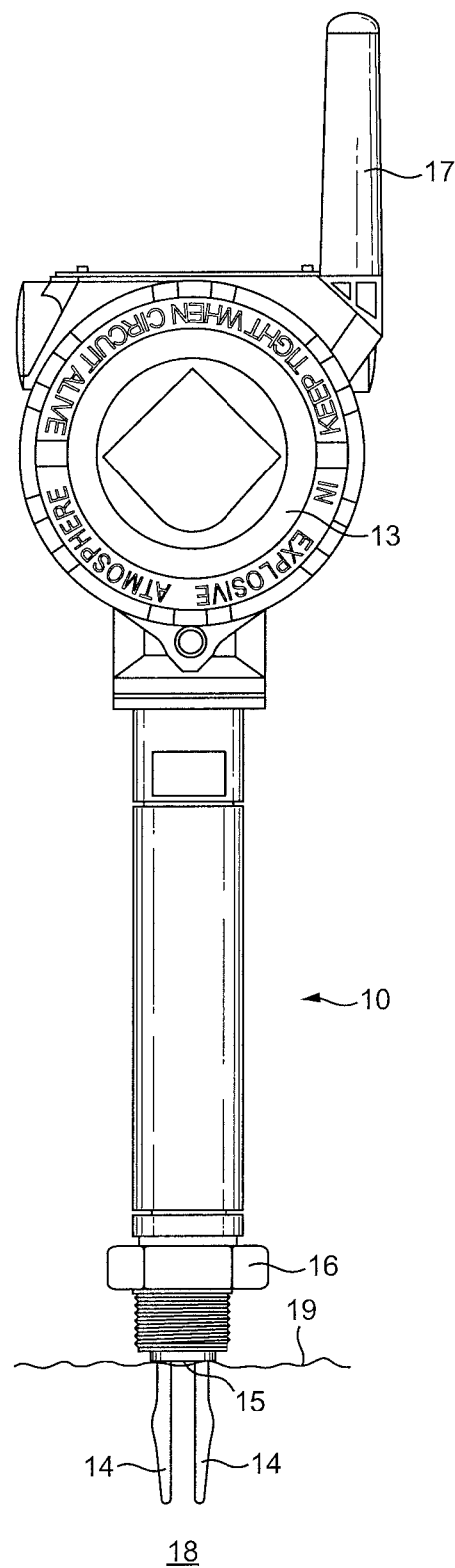
FIG. 2: shows the fork or sensor of the switch of FIG. 1 fully immersed in a medium with which it is to be used.

Referring firstly to FIGS. 1 and 2, the present invention provides a method of configuring for use a vibrating fork level switch 10. In the form shown the switch includes a sensor in the form of fork assembly 11 mounted at one end of tube 12, a housing 13 being mounted on the opposite end of tube 12. The fork assembly comprises a pair of tines 14 extending from a diaphragm 15. The tube 12 typically includes a mounting 16 to allow the device to be mounted on the wall of a process vessel and contained within the housing 13 are the operating electronics which include a microcontroller (not shown). The switch may be battery powered and, in the form shown, includes an antenna 17 to allow the switch to communicate with a remote control facility.

The operation of this type of device requires a knowledge of the dry fork frequency (DFF), this being the natural or resonant frequency at which the fork assembly 11 vibrates in air. This is typically established at point of manufacture but may also be established or adjusted when the switch is installed in a working environment. In FIG. 1 the switch 10 is shown in air above a medium 18. In the normal manner, as the surface 19 of the medium rises and comes into contact with the fork assembly 11, the frequency of vibration of the fork falls and, at a predetermined change in frequency from the DFF, the switch will operate. Generally, the switch is configured so that the switching point corresponds to a defined level of immersion of the fork assembly in the medium, say 13 mm. However, because changes in frequency of the fork will vary with changes in density of the medium 18, the switching point will also vary.

A characteristic feature of this invention is that not only is the DFF used in configuring the device, but also a frequency reading established by fully immersing the fork assembly 11 in the medium 18. This is illustrated in FIG. 2 and is referred to herein as WFF. In order to establish the WFF the roots of the tines 14 i.e. the junctions between the tines 14 and the diaphragm 15 should be immersed in the medium. The switch may be further immersed but we have found that further immersion has little influence on WFF.

Figure 3:
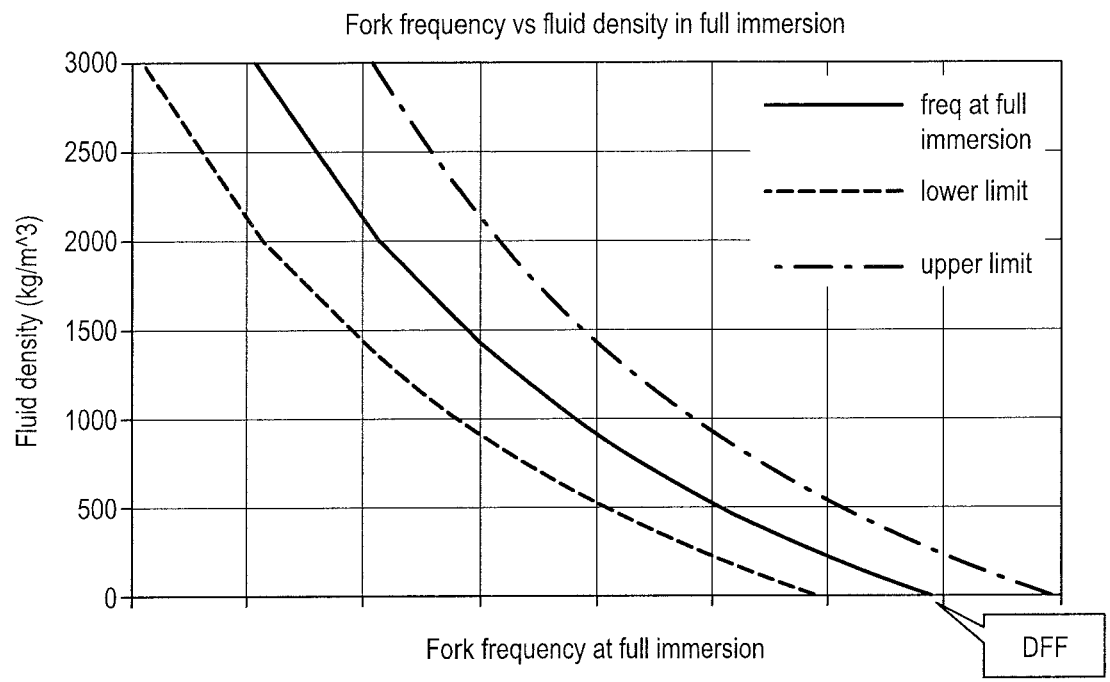
FIG. 3: shows a plot of the relationship between switch fork frequency and medium density when the fork is fully immersed in the medium.

For a given fork design WFF can be established for a range of media of different densities as shown in FIG. 3. It will be appreciated that, when the density of the medium or liquid is very low, the WFF is the same as the DFF. The data underlying FIG. 3 is obtained experimentally and/or by finite element analysis simulation and, once the data has been plotted, a polynomial fit is applied to give the curves shown. FIG. 3 shows three curves, one to either side of the full line representing fork frequency at full immersion. The outer curves are upper and lower limits resulting from manufacturing factors such as material variation. As can be seen, these simply vary the DFF left or right and shift the whole curve in the same way.

Figure 4:
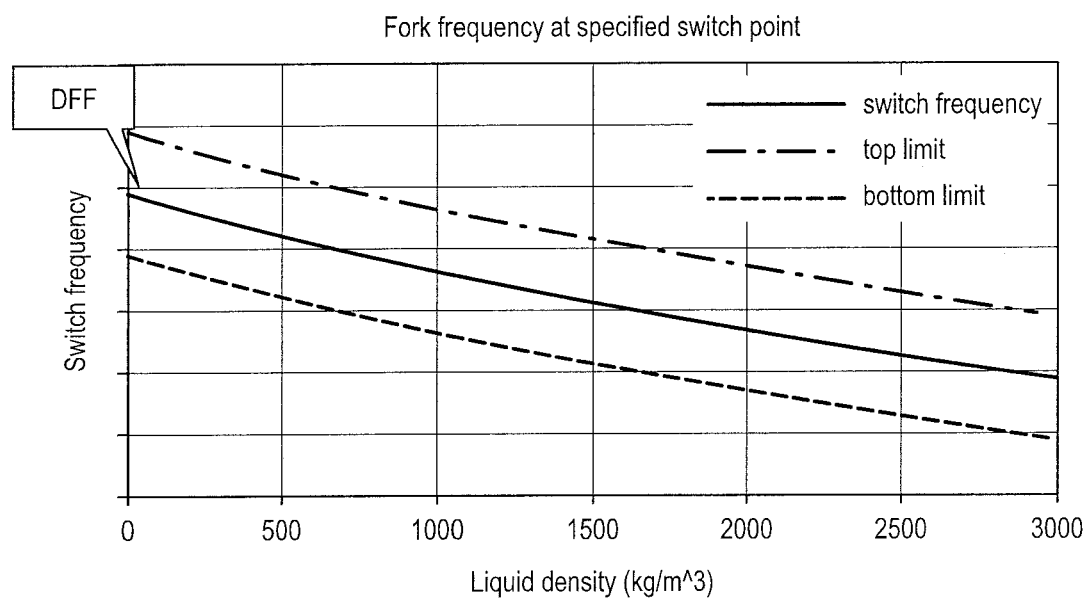
FIG. 4: shows a plot of the relationship between medium density and switching frequency.

In much the same manner, a relationship can be established between media (or liquid) density, and switching point, as shown in FIG. 4. In this case, the switch is held at the switching point immersion depth of 13 mm, in media of various densities, and the switching frequency recorded. This, too, can be undertaken by manual experimentation or by finite element analysis simulation and, once again, polynomials are derived from the raw data and upper and lower limits established.

Having established FIGS. 3 and 4, the switch point setting appropriate for a particular medium application can be set by the microcontroller within housing 13, or manually.

Thus the steps to be followed to adapt switch 10 to a particular medium are:

i) If a DFF appropriate to the working environment is desired, establish the DFF and save into the microcontroller memory. Otherwise use the DFF already calibrated.

ii) Fully immerse the fork assembly in the medium and record the WFF.

iii) The fluid density can be established from FIG. 3 using a polynomial fitting of the curve according to the equation:

$$\rho = a \times WFF^3 + b \times WFF^2 + c \times WFF + d + e \times DFF \quad \text{(formula 1)}$$

where a, b, c, d, & e are constants derived from the polynomial curve fitting algorithm.

iv) Using the measure of density derived from formula 1, the switch frequency (SF) at a defined switch point can be found from FIG. 4, using a polynomial curve fitting according to the equation:

$$SF = a1 \times \rho^2 + b1 \times \rho + c1 \times DFF \quad \text{(formula 2)}$$

where a1, b1 & c1 are constants derived from the polynomial curve fitting algorithm ii) Bearing in mind that, in practice, the fluid level may only fluctuate to a small extent, a degree of hysteresis should be included in the actual switch frequency to damp rapid changes of switch state and prevent rapid successive changes from wet to dry and vice versa.

Referring now to FIG. 5, a comparison is shown between a prior art device, in which only the DFF is used to establish the switching point, and a switch configured for use according to the invention. It can be seen that, as density increases, the error in the switching point of the prior art switch becomes progressively larger while, when applying the invention, any variation in the switching point is virtually negligible.

Furthermore, the two polynomials in formulae 1 and 2 can be combined as shown below, to explicitly exclude the variable density value in order to derive the SF directly from the DFF and WFF such as, for example:

$$SF = a0 \times WFF^6 + b0 \times WFF^5 + c0 \times WFF^4 + d0 \times WFF^3 + e0 \times WFF^2 + f0 \times WFF + g0 \times DFF^2 + h0 \times DFF + I0 \quad \text{(formula 3)}$$

where a0, b0, c0, d0, e0, f0, g0, h0 and I0 are constants derived from substituting formula 1 into formula 2.

In implementing the invention, and as an alternative to the precise establishment of switching frequency described above, we can use DFF bands, and the measured WFF, to establish an appropriate switching frequency.

Figure 7:
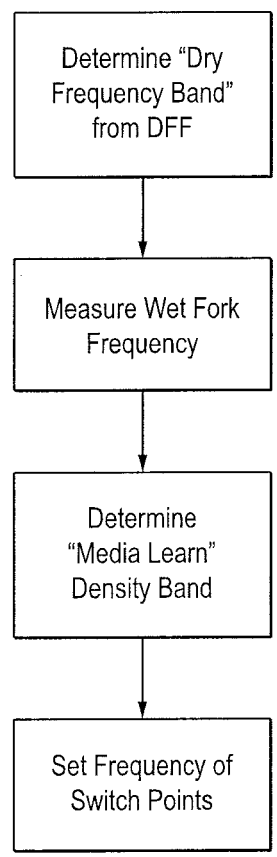
FIG. 7: shows a basic flowchart relating to the table shown in FIG. 6.

Turning now to FIGS. 6 & 7, rather than establishing and applying precise switching points it may be more convenient, and less confusing to customers, to configure a switch for use in, say, low, medium, normal and high density applications. FIG. 6 has been populated with bands of frequency values calculated from Formula 1.

As a first step a band in FIG. 6 is identified in which the DFF falls. The WFF is then measured to determine the appropriate density band such as low, medium, normal or high. Having identified the DFF and density band, the microcontroller then derives a switching frequency from the combination of formulae 1 and 2 by using the DFF and, say, the middle of the density band.

As well as being used to configure a vibrating fork level switch for accurate switching, the invention may also be used to determine the degree to which one medium is suspended in another. A specific example of this is to establish the degree to which sand is suspended in water.

Given a knowledge of the density of water ($\rho_0$) and the DFF, the switch is then used to establish WFF by fully immersing the fork assembly in the mixture water and sand (or other two media). Having established WFF, the total fluid density ($\rho$) with suspended particles is then obtained from formula 1 using WFF and DFF.

The percentage particle content in the mixture is then calculated according to an equation such as:

$$PCP=((\rho-\rho_o)/\rho_o)\times 100$$

Thus the present invention provides an effective means of configuring for use a vibrating fork which requires no changes in hardware while permitting the fork to be used effectively whilst displaying high accuracy with a variety of different media. By simply fully immersing the vibrating sensor in the medium with which the sensor is to be used, the switch can determine and set operating parameters, including a switching frequency, appropriate for that medium.

The invention claimed is:

1. A method of configuring for use in different media a vibrating fork level switch, said method comprising the steps of:
   establishing for said switch a relationship between wet fork frequency (WFF) and density;
   establishing a relationship between density and switching frequency at a given point for said switch;
   determining a frequency of vibration of the switch in air (DFF);
   determining a frequency reading (WFF) obtained from fully immersing said switch in a medium with which said switch is to be used;
   combining measures of DFF and WFF to determine a density of said medium; and
   from the determined density establishing a switching frequency for said switch in said medium.

2. The method as claimed in claim 1 comprising establishing the switching frequency (SF) for said switch from the DFF and WFF based on a polynomial.

3. The method as claimed in claim 2 wherein said polynomial is a $6^{th}$ order polynomial.

4. The method as claimed in claim 1 wherein said measures of DFF and WFF are classified into bands, the combination of two bands being used to establish a density classification for said medium.

5. The method as claimed in claim 4 further comprising allocating a switching frequency to each density classification at a given switch point.

6. The method as claimed in claim 1 when applied to the determination of the content of one medium suspended in a carrier liquid of density $\rho_o$, said method comprising measuring the WFF of a combination of said medium in said carrier liquid to derive a combination density $\rho$ and comparing $\rho_o$ and $\rho$ to derive an indication of the amount of medium in said carrier liquid.

7. The method as claimed in claim 6 wherein the percentage of medium (PCM) in said carrier liquid can be calculated according to the expression:

$$PCM=((\rho-\rho_o)/\rho_o)\times 100$$

8. The vibrating fork level switch configured to undertake and/or apply the methods set forth in claim 1.

* * * * *